United States Patent
Finley (10) Patent No.: US 7,917,255 B1
(45) Date of Patent: Mar. 29, 2011

(54) SYSTEM AND METHOD FOR ON-BOARD ADAPTIVE CHARACTERIZATION OF AIRCRAFT TURBULENCE SUSCEPTIBILITY AS A FUNCTION OF RADAR OBSERVABLES

(75) Inventor: Jeffrey A. Finley, Cedar Rapids, IA (US)

(73) Assignee: Rockwell Colllins, Inc., Cedar Rapids, IA (US)

( * ) Notice: Subject to any disclaimer, the term of this patent is extended or adjusted under 35 U.S.C. 154(b) by 853 days.

(21) Appl. No.: 11/901,632

(22) Filed: Sep. 18, 2007

(51) Int. Cl.
*G01S 13/95* (2006.01)
*G06F 19/00* (2006.01)

(52) U.S. Cl. .......... 701/9; 701/10; 701/14; 340/945

(58) Field of Classification Search .......... 701/9, 10, 701/14, 47, 8; 244/76 C; 342/26 B, 26 D, 342/26 R, 179; 340/945
See application file for complete search history.

(56) References Cited

U.S. PATENT DOCUMENTS

| | | | |
|---|---|---|---|
| 3,970,030 A | 7/1976 | Stangeland |
| 3,979,105 A | 9/1976 | Pool et al. |
| 4,016,811 A | 4/1977 | Zavodny |
| 4,019,200 A | 4/1977 | Adkins et al. |
| 4,020,431 A | 4/1977 | Saunders |
| 4,032,094 A | 6/1977 | Morgan et al. |
| 4,042,822 A | 8/1977 | Brandewie et al. |
| 4,044,358 A | 8/1977 | Manning et al. |
| 4,051,473 A | 9/1977 | Hooker, Jr. |
| 4,060,314 A | 11/1977 | Heinz |
| 4,060,315 A | 11/1977 | Heinz |
| 4,063,140 A | 12/1977 | Kammerer et al. |
| 4,066,964 A | 1/1978 | Costanza et al. |
| 4,088,996 A | 5/1978 | Hooker, Jr. |
| 4,092,644 A | 5/1978 | Hodge |
| 4,096,448 A | 6/1978 | Hayes |
| 4,124,061 A | 11/1978 | Mitchell et al. |
| 4,128,837 A | 12/1978 | Page |
| 4,136,400 A | 1/1979 | Caswell et al. |
| 4,137,530 A | 1/1979 | Hooker, Jr. |
| 4,153,900 A | 5/1979 | Novak et al. |
| 4,155,896 A | 5/1979 | Rennier et al. |
| 4,162,496 A | 7/1979 | Downen et al. |
| 4,163,954 A | 8/1979 | Hayes |

(Continued)

OTHER PUBLICATIONS

"Technical Standard Order," TSO-C115b, Airborne Area Equipment Using Multi-Sensor Inputs, Sep. 30, 1994, 11 pages, Department of Transportation, Ferederal Aviation Administration, Washington, DC.

*Primary Examiner* — Tan Q Nguyen
(74) *Attorney, Agent, or Firm* — Matthew J. Evans; Daniel M. Barbieri (57) ABSTRACT

A turbulence data circuit for use in an aircraft. The aircraft can include a radar system configured to transmit a first radio frequency wave and receive a second radio frequency wave and a display for receiving a display signal representative of turbulence. The aircraft can further include a flight management system configured to determine a phase of flight, an aircraft inertial/air data system configured to determine an altitude and an airspeed. The turbulence data circuit can include an interface for coupling to the radar system, the display, the flight management system, and the aircraft inertial/air data system. The turbulence data circuit can be configured to determine the display signal representative of turbulence based on at least one of the phase of flight, the altitude, the airspeed and the second radio frequency wave.

20 Claims, 10 Drawing Sheets

U.S. PATENT DOCUMENTS

| | | |
|---|---|---|
| 4,169,263 A | 9/1979 | Hooker, Jr. |
| 4,170,010 A | 10/1979 | Reed |
| 4,171,504 A | 10/1979 | Strathman |
| 4,171,761 A | 10/1979 | Boldt et al. |
| 4,179,693 A | 12/1979 | Evans et al. |
| 4,187,519 A | 2/1980 | Vitols et al. |
| 4,190,807 A | 2/1980 | Weber |
| 4,191,558 A | 3/1980 | Gould |
| 4,215,936 A | 8/1980 | Winocur |
| 4,219,818 A | 8/1980 | Mansur, Jr. |
| 4,225,850 A | 9/1980 | Chang et al. |
| 4,270,223 A | 5/1981 | Marston |
| 4,290,316 A | 9/1981 | Noar et al. |
| 4,291,320 A | 9/1981 | Wen et al. |
| 4,307,618 A | 12/1981 | James et al. |
| 4,310,502 A | 1/1982 | Wagner |
| 4,314,682 A | 2/1982 | Barnett et al. |
| 4,323,901 A | 4/1982 | De Wames et al. |
| 4,327,364 A | 4/1982 | Moore |
| 4,330,721 A | 5/1982 | Hauck et al. |
| 4,344,675 A | 8/1982 | Yao |
| 4,347,896 A | 9/1982 | Rosman et al. |
| 4,354,247 A | 10/1982 | Yao |
| 4,354,646 A | 10/1982 | Raymer |
| 4,355,869 A | 10/1982 | Yao |
| 4,370,515 A | 1/1983 | Donaldson |
| 4,389,660 A | 6/1983 | Decker |
| 4,395,913 A | 8/1983 | Peterson |
| 4,427,926 A | 1/1984 | Strathman |
| 4,431,974 A | 2/1984 | Landt |
| 4,459,568 A | 7/1984 | Landt |
| 4,482,183 A | 11/1984 | Grimm et al. |
| 4,498,347 A | 2/1985 | Grantham et al. |
| 4,498,531 A | 2/1985 | Vrolyk |
| 4,498,773 A | 2/1985 | Von Bieren |
| 4,503,908 A | 3/1985 | Rosman et al. |
| 4,506,385 A | 3/1985 | Fedde et al. |
| 4,509,049 A | 4/1985 | Haendel et al. |
| 4,513,383 A | 4/1985 | Hackett, Jr. |
| 4,523,638 A | 6/1985 | Rosman et al. |
| 4,535,840 A | 8/1985 | Rosman et al. |
| 4,536,603 A | 8/1985 | Sprouse et al. |
| 4,538,281 A | 8/1985 | Rajan |
| 4,538,749 A | 9/1985 | Rosman et al. |
| 4,543,873 A | 10/1985 | Stock |
| 4,568,938 A | 2/1986 | Ubriaco |
| 4,575,821 A | 3/1986 | Eden et al. |
| 4,583,094 A | 4/1986 | Mosier |
| 4,594,676 A | 6/1986 | Breiholz et al. |
| 4,599,618 A | 7/1986 | Haendel et al. |
| 4,600,925 A | 7/1986 | Alitz et al. |
| 4,619,290 A | 10/1986 | Katz |
| 4,628,318 A | 12/1986 | Alitz |
| 4,645,140 A | 2/1987 | Bevilaqua et al. |
| 4,671,676 A | 6/1987 | Chen et al. |
| 4,680,727 A | 7/1987 | White |
| 4,682,933 A | 7/1987 | Wagner |
| 4,682,985 A | 7/1987 | Kohl |
| 4,717,917 A | 1/1988 | Alitz |
| 4,740,062 A | 4/1988 | Rodriguez |
| 4,740,899 A | 4/1988 | McElreath |
| 4,749,032 A | 6/1988 | Rosman et al. |
| 4,756,493 A | 7/1988 | Camaret |
| 4,759,506 A | 7/1988 | Moore et al. |
| 4,761,059 A | 8/1988 | Yeh et al. |
| 4,763,128 A | 8/1988 | Caswell |
| 4,773,918 A | 9/1988 | Kohl |
| 4,776,536 A | 10/1988 | Hudson et al. |
| 4,784,352 A | 11/1988 | Smith et al. |
| 4,800,840 A | 1/1989 | Colton |
| 4,814,729 A | 3/1989 | Becker |
| 4,823,139 A | 4/1989 | Eisner et al. |
| 4,854,183 A | 8/1989 | Periou et al. |
| 4,862,739 A | 9/1989 | Dobbs |
| 4,867,503 A | 9/1989 | Luksch et al. |
| 4,875,769 A | 10/1989 | Linebarger |
| 4,877,959 A | 10/1989 | Page |
| 4,884,077 A | 11/1989 | Landt |
| 4,896,218 A | 1/1990 | Vick |
| 4,911,537 A | 3/1990 | Ewbank |
| 4,947,174 A | 8/1990 | Lehman et al. |
| 4,952,941 A | 8/1990 | Landt |
| 4,953,954 A | 9/1990 | Ewbank et al. |
| 4,965,603 A | 10/1990 | Hong et al. |
| 4,973,154 A | 11/1990 | McMichael et al. |
| 4,990,741 A | 2/1991 | Moores et al. |
| 4,998,689 A | 3/1991 | Woodcock |
| 5,006,813 A | 4/1991 | Khoshnevisan et al. |
| 5,015,083 A | 5/1991 | Wurst et al. |
| 5,017,199 A | 5/1991 | Etchepare |
| 5,033,696 A | 7/1991 | Horstman |
| 5,047,775 A | 9/1991 | Alitz |
| 5,049,886 A | 9/1991 | Seitz et al. |
| 5,053,773 A | 10/1991 | Mosinski |
| 5,055,805 A | 10/1991 | Kan |
| 5,119,236 A | 6/1992 | Fong et al. |
| 5,125,111 A | 6/1992 | Trinh |
| 5,125,600 A | 6/1992 | Brumbaugh |
| 5,128,873 A | 7/1992 | Gilmour et al. |
| 5,129,605 A | 7/1992 | Burns et al. |
| 5,132,689 A | 7/1992 | Van Wyk |
| 5,143,334 A | 9/1992 | Sardou et al. |
| 5,148,323 A | 9/1992 | Campbell et al. |
| 5,167,386 A | 12/1992 | Laquer et al. |
| 5,181,027 A | 1/1993 | Shafer |
| 5,198,828 A | 3/1993 | West et al. |
| 5,216,611 A | 6/1993 | McElreath |
| 5,218,440 A | 6/1993 | Mathur |
| 5,233,551 A | 8/1993 | White |
| 5,235,930 A | 8/1993 | Pendleton |
| 5,249,027 A | 9/1993 | Mathur et al. |
| 5,258,860 A | 11/1993 | Schehrer et al. |
| 5,261,759 A | 11/1993 | Decoux |
| 5,265,266 A | 11/1993 | Trinh |
| 5,276,326 A | 1/1994 | Philpott |
| 5,283,672 A | 2/1994 | Hong et al. |
| 5,316,032 A | 5/1994 | DeCoux |
| 5,323,223 A | 6/1994 | Hayes |
| 5,337,016 A | 8/1994 | Wozniak et al. |
| 5,337,056 A | 8/1994 | Dax |
| 5,337,257 A | 8/1994 | White |
| 5,348,689 A | 9/1994 | Gay et al. |
| 5,350,966 A | 9/1994 | Culp |
| 5,351,044 A | 9/1994 | Mathur et al. |
| 5,366,177 A | 11/1994 | DeCoux |
| 5,392,152 A | 2/1995 | Higgins et al. |
| 5,402,965 A | 4/1995 | Cervisi et al. |
| 5,404,306 A | 4/1995 | Mathur et al. |
| 5,423,123 A | 6/1995 | McQuilkin et al. |
| 5,428,361 A | 6/1995 | Hightower et al. |
| 5,454,007 A | 9/1995 | Dutta |
| 5,469,250 A | 11/1995 | Holmes |
| 5,481,268 A | 1/1996 | Higgins |
| 5,483,240 A | 1/1996 | Hsu et al. |
| 5,483,241 A | 1/1996 | Waineo et al. |
| 5,484,221 A | 1/1996 | DeCoux |
| 5,489,918 A | 2/1996 | Mosier |
| 5,504,482 A | 4/1996 | Schreder |
| 5,517,197 A | 5/1996 | Algeo et al. |
| 5,518,205 A | 5/1996 | Wurst et al. |
| 5,528,698 A | 6/1996 | Kamei et al. |
| 5,534,697 A | 7/1996 | Creekmore et al. |
| 5,581,010 A | 12/1996 | Cunningham et al. |
| 5,585,813 A | 12/1996 | Howard |
| 5,592,382 A | 1/1997 | Colley |
| 5,609,388 A | 3/1997 | Hattass et al. |
| 5,627,541 A | 5/1997 | Haley et al. |
| 5,652,019 A | 7/1997 | Moran |
| 5,657,251 A | 8/1997 | Fiala |
| 5,663,736 A | 9/1997 | Webb et al. |
| 5,689,351 A | 11/1997 | Hong |
| 5,748,136 A | 5/1998 | Fischer |
| 5,828,489 A | 10/1998 | Johnson et al. |
| 5,832,117 A | 11/1998 | Harris et al. |
| 5,841,537 A | 11/1998 | Doty |
| 5,926,790 A | 7/1999 | Wright |
| 5,936,552 A | 8/1999 | Wichgers et al. |

| Patent | Date | Inventor |
|---|---|---|
| 5,991,460 A | 11/1999 | Mitchell |
| 6,064,942 A | 5/2000 | Johnson et al. |
| 6,128,553 A | 10/2000 | Gordon et al. |
| 6,150,901 A | 11/2000 | Auken |
| 6,154,151 A | 11/2000 | McElreath et al. |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 * | 2/2001 | Zheng et al. ............... 342/26 R |
| 6,194,980 B1 | 2/2001 | Thon |
| 6,201,494 B1 | 3/2001 | Kronfeld |
| 6,208,284 B1 | 3/2001 | Woodell et al. |
| 6,259,400 B1 | 7/2001 | Higgins et al. |
| 6,266,011 B1 | 7/2001 | Hong |
| 6,266,114 B1 | 7/2001 | Skarohlid |
| 6,281,832 B1 | 8/2001 | McElreath |
| 6,281,838 B1 | 8/2001 | Hong |
| 6,285,298 B1 | 9/2001 | Gordon |
| 6,285,337 B1 | 9/2001 | West et al. |
| 6,285,926 B1 | 9/2001 | Weiler et al. |
| 6,345,127 B1 | 2/2002 | Mitchell |
| 6,362,797 B1 | 3/2002 | Dehmlow |
| 6,373,216 B1 | 4/2002 | Ho |
| 6,377,892 B1 | 4/2002 | Johnson et al. |
| 6,381,538 B1 | 4/2002 | Robinson et al. |
| 6,388,607 B1 | 5/2002 | Woodell |
| 6,388,608 B1 | 5/2002 | Woodell et al. |
| 6,401,013 B1 | 6/2002 | McElreath |
| 6,424,288 B1 | 7/2002 | Woodell |
| 6,426,717 B1 | 7/2002 | Maloratsky |
| 6,433,772 B1 | 8/2002 | Krenz |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,466,235 B1 | 10/2002 | Smith et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,571,171 B1 | 5/2003 | Pauly |
| 6,574,030 B1 | 6/2003 | Mosier |
| 6,577,947 B1 | 6/2003 | Kronfeld et al. |
| 6,603,425 B1 | 8/2003 | Woodell |
| 6,650,275 B1 | 11/2003 | Kelly et al. |
| 6,650,972 B1 * | 11/2003 | Robinson et al. ............... 701/3 |
| 6,690,298 B1 | 2/2004 | Barber et al. |
| 6,690,299 B1 | 2/2004 | Suiter |
| 6,714,186 B1 | 3/2004 | Mosier et al. |
| 6,721,181 B1 | 4/2004 | Pfeifer et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,761,986 B2 | 7/2004 | Cheung |
| 6,762,661 B1 | 7/2004 | Higgins |
| 6,771,626 B1 | 8/2004 | Golubiewski et al. |
| 6,804,614 B1 | 10/2004 | McGraw et al. |
| 6,805,325 B1 | 10/2004 | Malmuth et al. |
| 6,806,846 B1 | 10/2004 | West |
| 6,819,983 B1 | 11/2004 | McGraw |
| 6,822,617 B1 | 11/2004 | Mather et al. |
| 6,822,850 B2 | 11/2004 | Pfeifer et al. |
| 6,839,017 B1 | 1/2005 | Dillman |
| 6,850,185 B1 | 2/2005 | Woodell |
| 6,865,080 B2 | 3/2005 | Radosevich et al. |
| 6,879,280 B1 | 4/2005 | Bull et al. |
| 6,882,302 B1 | 4/2005 | Woodell et al. |
| 6,885,553 B2 | 4/2005 | Pfeifer et al. |
| 6,898,072 B2 | 5/2005 | Beihoff et al. |
| 6,909,607 B2 | 6/2005 | Radosevich et al. |
| 6,917,860 B1 | 7/2005 | Robinson et al. |
| 6,918,134 B1 | 7/2005 | Sherlock et al. |
| 6,919,862 B2 | 7/2005 | Hacker et al. |
| 6,940,715 B2 | 9/2005 | Beihoff et al. |
| 6,950,062 B1 | 9/2005 | Mather et al. |
| 6,956,742 B2 | 10/2005 | Pfeifer et al. |
| 6,965,514 B2 | 11/2005 | Beihoff et al. |
| 6,972,727 B1 | 12/2005 | West et al. |
| 6,972,957 B2 | 12/2005 | Beihoff et al. |
| 6,973,150 B1 | 12/2005 | Thuringer |
| 6,977,608 B1 | 12/2005 | Anderson et al. |
| 6,982,873 B2 | 1/2006 | Meyer et al. |
| 6,989,084 B2 | 1/2006 | Tench et al. |
| 6,992,549 B2 | 1/2006 | Higgins |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,016,192 B2 | 3/2006 | Beihoff et al. |
| 7,032,695 B2 | 4/2006 | Beihoff et al. |
| 7,034,753 B1 | 4/2006 | Elsallal et al. |
| 7,038,558 B2 | 5/2006 | Higgins |
| 7,061,775 B2 | 6/2006 | Beihoff et al. |
| 7,068,129 B2 | 6/2006 | Higgins et al. |
| 7,068,507 B2 | 6/2006 | Pfeifer et al. |
| 7,081,834 B2 | 7/2006 | Ruokangas et al. |
| 7,081,991 B2 | 7/2006 | Jones et al. |
| 7,089,092 B1 | 8/2006 | Wood et al. |
| 7,092,645 B1 | 8/2006 | Sternowski |
| 7,095,612 B2 | 8/2006 | Beihoff et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 * | 11/2006 | Christianson ............... 342/26 R |
| 7,142,434 B2 | 11/2006 | Beihoff et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,177,153 B2 | 2/2007 | Radosevich et al. |
| 7,187,548 B2 | 3/2007 | Meyer et al. |
| 7,187,568 B2 | 3/2007 | Radosevich et al. |
| 7,196,329 B1 | 3/2007 | Wood et al. |
| 7,205,933 B1 | 4/2007 | Snodgrass |
| 7,212,407 B2 | 5/2007 | Beihoff et |
| 7,219,011 B1 | 5/2007 | Barber |
| 7,242,343 B1 | 7/2007 | Woodell |
| 7,272,472 B1 | 9/2007 | McElreath |
| 7,280,498 B1 | 10/2007 | Mitchell |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,596 B1 | 12/2007 | West |
| 7,471,995 B1 * | 12/2008 | Robinson ............... 701/3 |
| 7,633,430 B1 * | 12/2009 | Wichgers et al. ............... 342/65 |
| 7,696,920 B1 * | 4/2010 | Finley et al. ............... 342/26 B |

* cited by examiner

SYSTEM AND METHOD FOR ON-BOARD ADAPTIVE CHARACTERIZATION OF AIRCRAFT TURBULENCE SUSCEPTIBILITY AS A FUNCTION OF RADAR OBSERVABLES

BACKGROUND

The present disclosure relates generally to the field of aviation. Specifically, the present disclosure relates to characterization of aircraft turbulence susceptibility.

In general, airborne weather radars detect turbulence by measuring Doppler spectral width. The magnitude of the turbulence is correlated with this radar observable spectral width. The spectral width is an environmental parameter, which does not vary from aircraft to aircraft. In addition to spectral width, the turbulence magnitude experienced by the crew and passengers within an aircraft is dependent on the aircraft's dynamic response to the wind field. The dynamic response varies with aircraft type, aircraft speed, aircraft weight, aircraft altitude, and other flight conditions.

It is important for airborne weather radar system to accurately display turbulence to the flight crew. In some installations; however, aircraft dependant parameters, such as weight and aircraft type are not available to the radar.

There is a need for a turbulence detection and display system configured to provide turbulence information and alerts that does not rely on aircraft specific data. Further, there is a need for a turbulence detection and display system that does not depend on high-fidelity aerodynamic data and pilot in the loop simulation methodologies, which can be a significant cost source. Yet further, there is a need for a turbulence detection and display system that allows the aircrew to more effectively determine the appropriate course of action during aircraft flight.

It would be desirable to provide a system and/or method that fulfills one or more of these needs or provides other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to a turbulence data circuit for use in an aircraft. The aircraft includes a radar system configured to transmit a first radio frequency wave and receive a second radio frequency wave and a display for receiving a display signal representative of turbulence. The aircraft further includes a flight management system configured to determine a phase of flight, and an aircraft inertial/air data system configured to determine an altitude and an airspeed. The turbulence data circuit includes an interface for coupling to the radar system, the display, the flight management system, and the aircraft inertial/air data system. The turbulence data circuit is configured to provide a signal representative of the presence turbulence based on at least one of the phase of flight, the altitude, the airspeed and the second radio frequency wave.

Another embodiment of the disclosure relates to a method for providing a turbulence detection and display system including transmitting a first radio frequency wave and receiving a second radio frequency wave. The method further includes receiving a phase of flight signal, an altitude signal, and an airspeed signal. The method also includes determining a presence of turbulence based on the second radio frequency wave, the phase of flight signal, the altitude signal and the airspeed signal, and providing a signal representative of the presence of turbulence.

Another embodiment of the disclosure relates to a turbulence detection and display system including a means for transmitting a first radio frequency wave and a means for receiving a second radio frequency wave. The turbulence detection and display system further includes a means for receiving a phase of flight signal, an altitude signal, and an airspeed signal. The turbulence detection and display system also includes a means for determining a presence of turbulence based on the second radio frequency wave, the phase of flight signal, the altitude signal and the airspeed signal. The turbulence detection and display system includes a means for transmitting a signal representative of the presence of turbulence.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
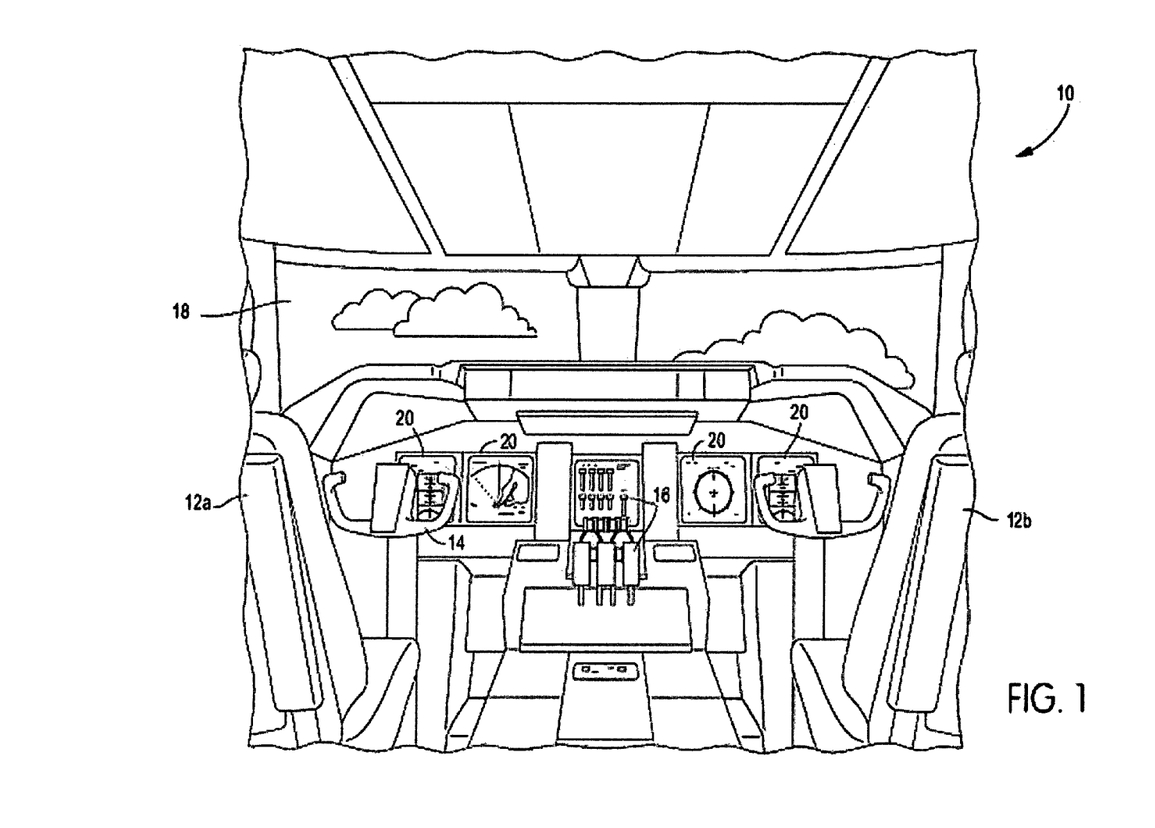
FIG. 1 is a is an illustration of an aircraft control center or cockpit, according to one exemplary embodiment.

Referring to FIG. 1, an illustration of an aircraft control center or cockpit 10 is shown, according to one exemplary embodiment. Aircraft control center 10 may include a pilot seat 12a, a co-pilot seat 12b, an aircraft control stick 14, a plurality of flight controls 16 and flight displays 20. The pilot sitting in pilot seat 12a or co-pilot seat 12b may utilize aircraft control stick 14 or other control devices to maneuver airplane 101. The pilot may initiate airplane 101 maneuvers including moving airplane 101 in an upwardly motion, downwardly motion, banking to the left, banking to the right or any combination thereof. The pilot can visually monitor the flight path thorough windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain (i.e., mountains and hills), fixed obstacles (i.e., towers), variable obstacles (i.e., other airplanes), flight characteristics (i.e., altitude or speed), or any combination thereof.

Figure 2A:
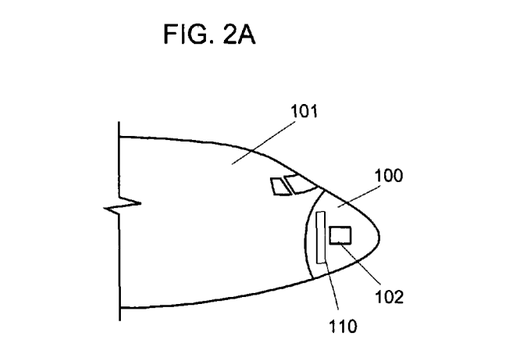
FIG. 2A is an illustration of an aircraft cone section, which includes the turbulence circuit, according to an exemplary embodiment.

Referring to FIG. 2A, an illustration of an aircraft cone section 100, which includes a turbulence circuit 110 and a radar system 102 is shown, according to an exemplary embodiment. In an exemplary embodiment, turbulence circuit 110 utilizes a directional receiver and an active radar for detection of turbulence sources. It should be noted that the turbulence source can be any source detectable by radar system 102 and/or turbulence circuit 110. It should be noted that turbulence circuit 110 can be integrated into radar system 102. In an exemplary embodiment, turbulence circuit can be included in a WRT-4100 model and is a software routine operating on the computing platform associated with a weather radar or other avionic system.

In an exemplary embodiment, radar system 102 is configured to include all the functionality of a RTA-4100 model, a WXR-2100 model or a RDR-4000 model. The RTA-4100 model and the WXR-2100 may be purchased from Rockwell Collins, Cedar Rapids, Iowa 52498. The RDR-4000 model may be purchased from Honeywell, Morristown, N.J. 07962. In another exemplary embodiment, radar system 102 includes any forward-looking radar system and is not limited to weather radars. In an exemplary embodiment, aircraft cone section 100 may also include equipment associated with a TAWS, GPWS, GCAS, WRT or any combination thereof. In an exemplary embodiment, display 106 (see FIG. 2B) can be an audio display, a visual display or both.

In an exemplary embodiment, radar system 102 transmits and receives multiple pulses. These multiple radar pulses are utilized to determine a radar observed parameter called spectral width, according to an exemplary embodiment. Spectral width is an environmental parameter only. In an exemplary embodiment, a more useful parameter can be one, which takes into account the effect of the environment on the aircraft. In an exemplary embodiment, external parameters of airspeed, altitude and/or phase of flight are used in an algorithm or software routine within radar system 102 or turbulence circuit 110 to scale the spectral width parameter by the dynamic response of the aircraft. In an exemplary embodiment, phase of flight parameter whether determined externally in the flight management system or determined internally within radar system 102 or turbulence circuit 110 is utilized to predicted turbulence. In an exemplary embodiment, radar system 102 or turbulence circuit 110 predicts and automatically correlates actual turbulence to predicted turbulence within radar system 102 or turbulence circuit 110 in order to determine the dynamic response of the aircraft.

In an exemplary embodiment, turbulence circuit 110 may be utilized in combination with or integrated with a terrain awareness warning system that employees a terrain database to communicate with aircrew that the aircraft's flight path may be on an imminent collision course with an obstacle. In an exemplary embodiment, turbulence circuit 110 may be utilized in combination with or integrated with a terrain awareness warning system that employees a radar system and/or a terrain database to determine obstacle sources. The terrain awareness warning system that employees a terrain database may include a Ground Proximity Warning System ("GPWS"), a Ground Collision Avoidance Systems ("GCAS"), a Terrain Awareness and Warning System or any combination thereof.

Figure 2B:
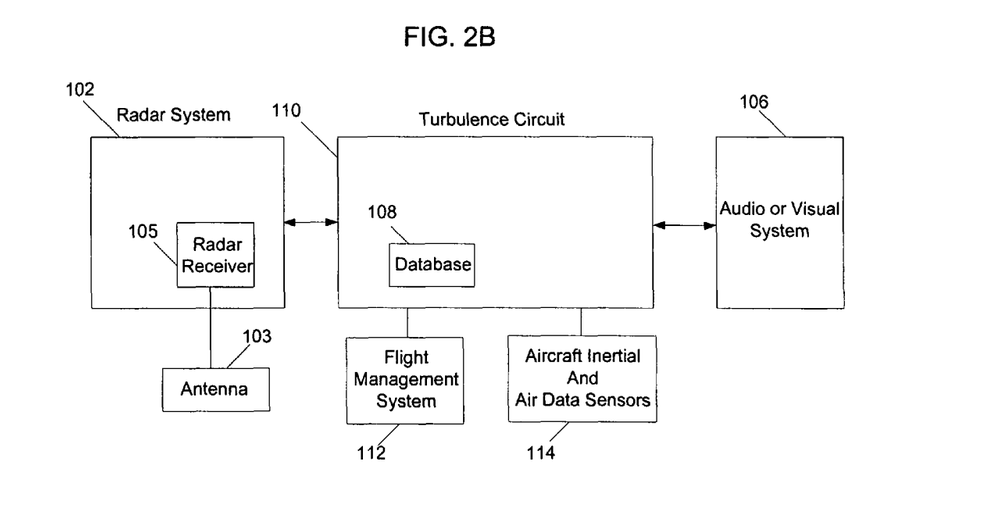
FIG. 2B is a block diagram of an aircraft turbulence detection and display system in communication with a radar system and audio/visual system, according to an exemplary embodiment.

In FIG. 2B, a block diagram of the aircraft turbulence detection and display system in communication with radar system and audio/visual system is shown, according to an exemplary embodiment. In an exemplary embodiment, turbulence circuit 110 can include a database 108. In an exemplary embodiment, database 108 can be utilized to store aircraft actual turbulence performance characteristics during a turbulence event, radar system 102 estimated turbulence, a comparison of radar system 102 estimated turbulence versus actual turbulence performance characteristics, actual turbulence performance characteristics versus phase of flight, estimated turbulence versus phase of flight, altitude, airspeed, weight, time of day, time of year and/or any other turbulence data known to a person skilled in the art.

In an exemplary embodiment, predicted value of turbulence from radar system 102 can be given in terms of spectral width and the output of turbulence circuit 110 can be given in vertical load. In another exemplary embodiment, predicted value of turbulence from radar system 102 can be given in vertical load and turbulence circuit 110 can be an adaptive gain algorithm which learns the specifies of a given aircraft and adjusts the calculation of the predicted value of turbulence by correcting radar system 102.

In an exemplary embodiment, turbulence circuit 110 is in communication with a flight management system 112, an inertial system and air data sensors 114, a display 106, and radar system 102. In an exemplary embodiment, radar system 102 includes a radar receiver 105, which is in communication with an antenna 103. In an exemplary embodiment radar receiver 105 can be a transceiver.

Figure 4:
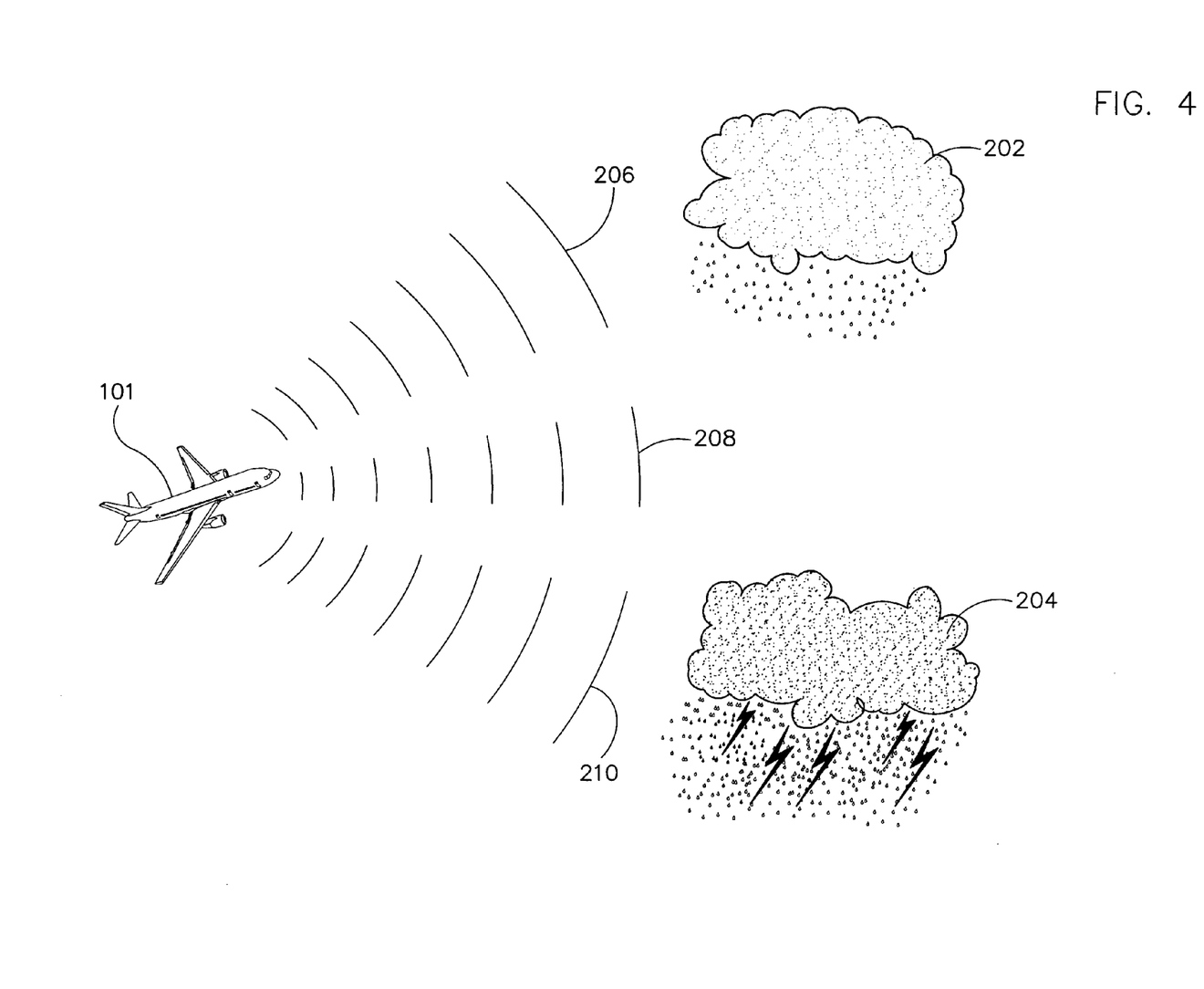
FIG. 4 is an illustration of an aircraft radar system identifying potential turbulence activity, according to an exemplary embodiment.
Figure 5:
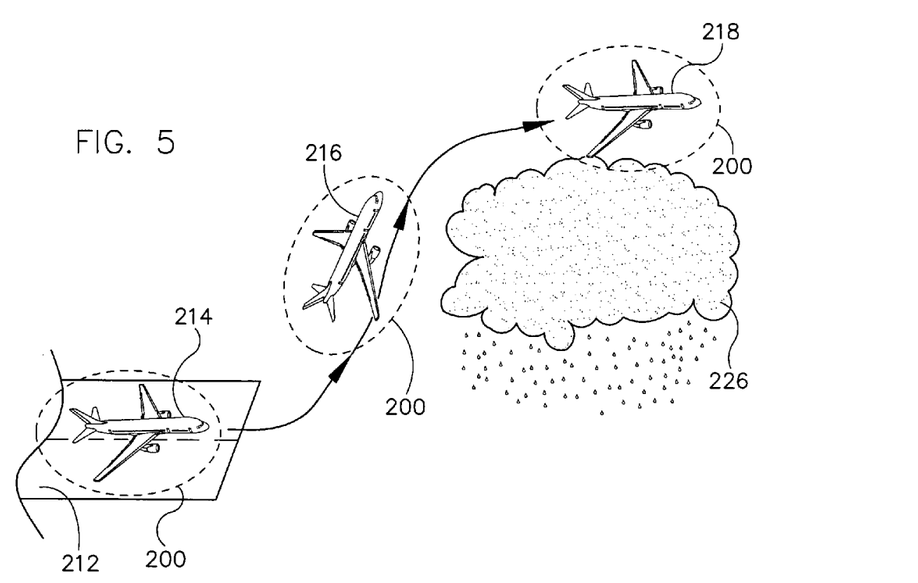
FIG. 5 is an illustration of an aircraft utilizing the aircraft turbulence detection and display system during take-off, climb, and cruise phase of flights, according to exemplary embodiments.
Figure 6:
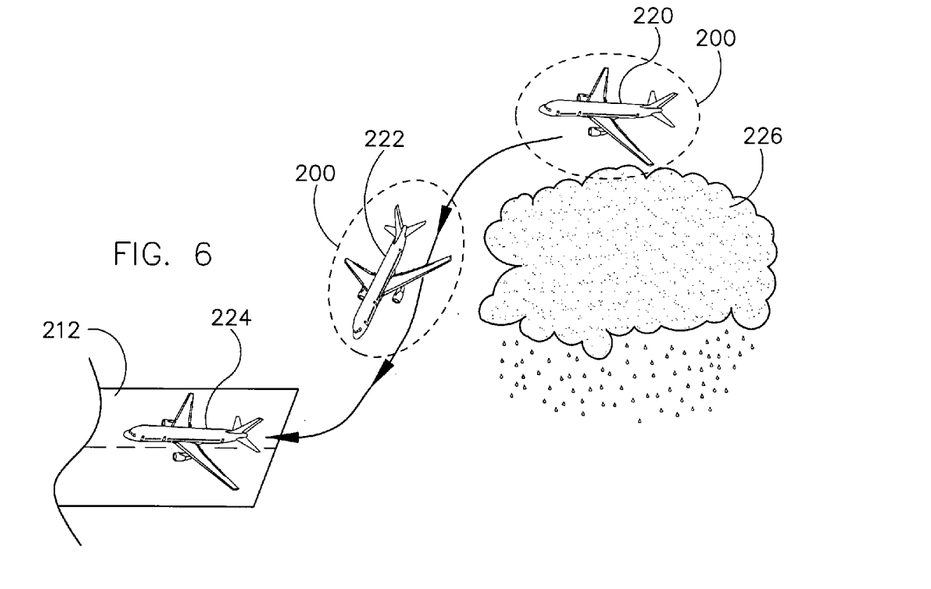
FIG. 6 is an illustration of an aircraft utilizing the aircraft turbulence detection and display system during cruise, descent, and approach phase of flights, according to exemplary embodiments.

In an exemplary embodiment, turbulence circuit 110 can determine a phase of flight 200 (see FIGS. 5 and 6). In an exemplary embodiment, phase of flight 200 can be preflight, takeoff, climb, cruise, descent, approach and go-around. It should be noted that phase of flight 200 can be any portion of the flight know to a person of ordinary skill in the art. In an exemplary embodiment, preflight is phase of flight 200 that occurs while airplane 101 (see FIG. 4) is still at the gate or taxiing. In an exemplary embodiment, takeoff is phase of flight 200 that occurs while airplane 101 is on a runway 212 and before airplane 101 starts to ascend (see FIG. 5). In an exemplary embodiment, climb is phase of flight 200 that occurs when airplane 101 is ascending to a cruise altitude. In an exemplary embodiment, cruise is phase of flight 200 that occurs enroute to a destination (see FIG. 6). In an exemplary embodiment, descent is phase of flight 200 that occurs when airplane 101 is descending to a new altitude in preparation for landing. In an exemplary embodiment, approach is phase of flight 200 that occurs when airplane 101 is maneuvering at low altitude prior to land. In an exemplary embodiment, go-around is phase of flight 200 that occurs when airplane 101 has executed a missed approach maneuver.

In an exemplary embodiment, phase of flight 200 can be computed based on at least one of a weight on wheels, a flight management flight plan, vertical speed and inputs from inertial system and air data sensors 114. In an exemplary embodiment, the flight management flight plan is determined from flight management system 112.

Figure 3:
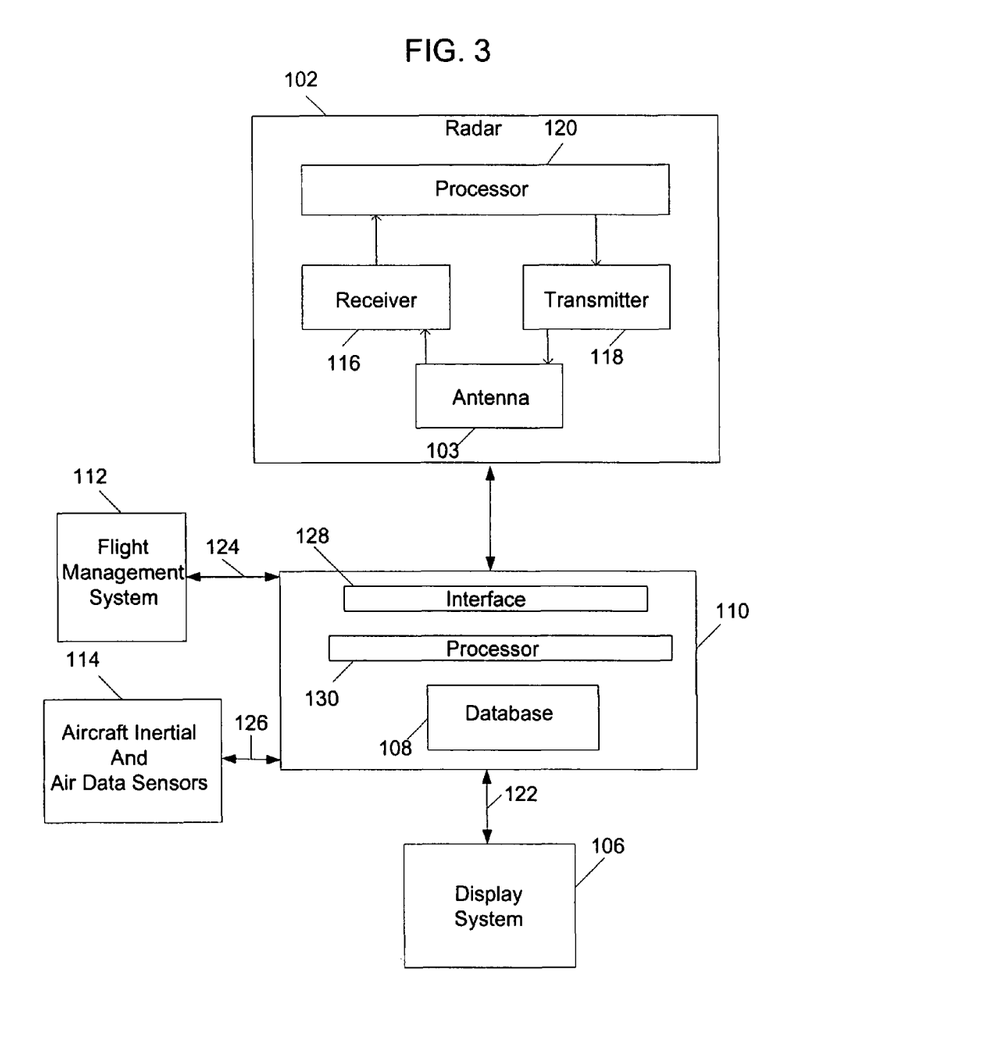
FIG. 3 is another block diagram of the aircraft turbulence detection and display system, according to an exemplary embodiment.

In FIG. 3, a block diagram of the aircraft turbulence detection and display system is shown, according to an exemplary embodiment. In an exemplary embodiment, radar system 102 includes a radar processor 120, a receiver 116, a transmitter 118 and antenna 103. In an exemplary embodiment, transmitter 118 transmits a first radio frequency wave that impacts a turbulence source 202, 204 (see FIG. 4). The first radio frequency wave impacts turbulence source 202, 204 and creates a second radio frequency wave. In an exemplary embodiment, second radio frequency wave is received by antenna 103. Antenna 103 transmits second radio frequency wave to receiver 116, which relays the data to radar processor 120.

In should be noted that a single turbulence source 202, 204 or multiple turbulence sources 202, 204 can be a turbulence profile.

In an exemplary embodiment, radar system 102 is in communication with turbulence circuit 110. In an exemplary embodiment, turbulence circuit 110 includes an interface 128, a turbulence circuit processor 130 and database 108. In an exemplary embodiment, interface 128 is in communication with radar system 102, flight management system 112, inertial system and air data sensors 114 and display 106.

In an exemplary embodiment, flight management system 112 transmits phase of flight 200 to turbulence circuit 110 via a first communication link 124. In another exemplary embodiment, flight management system 112 transmits phase of flight data via first communication link 124 and inertial system and air data sensors 114 transmit flight data (i.e., altitude, airspeed, time in flight, etc.) via a second communication link 126 to turbulence circuit 110. In this exemplary embodiment, turbulence circuit 110 can determine phase of flight 200 based on the flight data transmitted by flight management system 112 and inertial system and air data sensors 114. In another exemplary embodiment, phase of flight 200 can be determined by radar processor 120. In this exemplary embodiment, radar system 102 is in communication with flight management system 112 and inertial system and air data sensors 114. In this exemplary embodiment, radar processor 120 utilizes at least one of air data, inertial data, weight on wheels transitions, altitude transitions, vertical velocity, the flight management system's flight plan data or any other parameters available to radar system 102 to compute phase of flight 200. In this exemplary embodiment, radar system 102 transmits phase of flight 200 to turbulence circuit 110.

In an exemplary embodiment, turbulence circuit 110 transmits a display signal representative of turbulence based on at least one of the second radio frequency waves, a phase of flight signal, an altitude signal and an airspeed signal. In an exemplary embodiment, turbulence circuit 110 can transmit the display signal representative of turbulence based on the second radio frequency wave and phase of flight signal 200. It should be noted that turbulence circuit 110 utilizes at least one of these parameters but can be configured to utilize more than one parameter.

In an exemplary embodiment, turbulence circuit 110 determines the signal representative of turbulence by receiving data related to the second radio frequency wave. In an exemplary embodiment, turbulence circuit 110 determines a spectral width calculation based on the second radio frequency wave. In an exemplary embodiment, spectral width is converted to vertical load. In an exemplary embodiment, the signal representative of turbulence is based on the vertical load determination. In an exemplary embodiment, the signal representative of turbulence is based on the vertical load determination, phase of flight 200 and/or other parameters such as altitude and airspeed.

In an exemplary embodiment, an adaptive scheme can be employed utilizing radar system's 102 vertical load per spectral width function ("F") modified by a limited parameter ("P") where P is a constant or a function of flight phase. In an exemplary embodiment, the formula is: $\sigma\_load/\sigma\_spectralwidth = F(altitude, airspeed) * P(flight\ phase)$ where $\sigma\_load/\sigma\_spectralwidth$ is the function used by turbulence circuit 110 to create the signal representative of turbulence, which can be transmitted to display 106.

In an exemplary embodiment, the $\sigma\_load/\sigma\_spectralwidth$ parameter calculated in the previous paragraph is multiplied by the $\sigma\_spectralwidth$ parameter computed by radar system 102 and/or turbulence circuit 110. In this exemplary embodiment, this multiplication results in a value for $\sigma\_load$. If the $\sigma\_load$ value exceeds a threshold value, then the turbulence is displayed on display 20. If the $\sigma\_load$ value does not exceed a threshold value, then the turbulence is not displayed on display 20.

In an exemplary embodiment, $\sigma\_load$ is the acceleration in the vertical direction. In an exemplary embodiment, $\sigma\_load$ is an integrated root mean square ("RMS") over five (5) seconds. In an exemplary embodiment, turbulence circuit 110 measures the $\sigma\_load$ and compares $\sigma\_load$ to a threshold value. In an exemplary embodiment, a_load can be eighty (80) to one hundred and thirty-five (135) pounds per square inch. In an exemplary embodiment, if the $\sigma\_load$ is greater than or equal to the threshold value, then turbulence circuit 110 transmits an alert to display 106. In an exemplary embodiment, if the $\sigma\_load$ is less than the threshold value, then turbulence circuit 110 transmits a signal representative of turbulence. In this exemplary embodiment, the signal representative of turbulence can include no turbulence objects, advisory turbulence objects, turbulence objects or any combination thereof.

In an exemplary embodiment, radar system 102 can measure reflectivity, velocity and/or variations in Doppler velocity. In an exemplary embodiment, $\sigma\_spectralwidth$ is the variations in Doppler velocity. In an exemplary embodiment, turbulence circuit 110 can determine the σ_spectralwidth and compare σ_spectralwidth against a threshold value. In exemplary embodiments, the threshold value is four (4) or four and ½ (4.5) meters per second. It should be noted that these threshold values are for illustration purpose and do not limit the disclosure in anyway. It should also be noted that any threshold value known to those skilled in the art is herein incorporated in this disclosure.

In an exemplary embodiment, if the σ_spectralwidth is greater than or equal to the threshold value, then turbulence circuit 110 transmits an alert to display 106. In an exemplary embodiment, if the σ_spectralwidth is less than the threshold value, then turbulence circuit 110 can be configured to transmit a signal representative of turbulence. In this exemplary embodiment, the signal representative of turbulence can include no turbulence objects, advisory turbulence objects, turbulence objects or any combination thereof.

In an exemplary embodiment, turbulence circuit 110 can utilizes the σ_load and the σ_spectralwidth to determine alerts, advisory signals, caution signals, warning signals and/or signals representative of turbulence.

In an exemplary embodiment, P can be an in-flight derived modifier function. In an exemplary embodiment, phase of flight 200 is correlated with the in-flight derived modifier function to obtain a pseudo-weight sensitivity measurement without using aircraft dependant parameters.

In an exemplary embodiment, the value of P can be obtained through direct correlation of RMS turbulence encountered in situ as compared to RMS turbulence predicted by radar system 102. In an exemplary embodiment, this information can be obtained as part of normal flight operations after airplane's 101 entry into service. In an exemplary embodiment, a correlation in situ of accelerometer derived vertical load data with predicted radar data can be utilized in turbulence circuit 110. In this exemplary embodiment, the correlation processes can be conducted automatically in radar system 102 and/or turbulence circuit 110. In an exemplary embodiment, the P function can be read out by obtaining data during maintenance functions. In this exemplary embodiment, the P can be initialized more accurately for specific classes of aircraft. In an exemplary embodiment, turbulence circuit 110 can utilize a methodology based on in-service aircraft performance to fine-tune turbulence circuit's 110 turbulence alerting function.

In FIG. 4, an illustration of an aircraft radar system identifying potential turbulence activity is shown, according to an exemplary embodiment. In an exemplary embodiment, airplane 101 utilizing radar system 102 (see FIG. 3) transmits an upper radio frequency wave 206, a horizontal radio frequency wave 208 and a lower radio frequency wave 210. In this exemplary embodiment, upper radio frequency wave 206 contacts turbulence source 202. In this exemplary embodiment, turbulence source 202 is not a hazard to airplane 101 based on σ_load. In an exemplary embodiment, σ_spectralwidth is transformed into σ_load through the ratio of the two parameters described previously. In this exemplary embodiment, turbulence circuit 110 can be configured to control display 106 to show no hazard, an advisory alert, a caution alert, turbulence source 202 and/or any combination thereof. In an exemplary embodiment, turbulence circuit 110 can store the σ_load in database 108 and compare the σ_load with the actual turbulence experienced by airplane 101 at turbulence source 202.

In an exemplary embodiment, horizontal radio frequency wave 208 does not contact any turbulence source. In this exemplary embodiment, turbulence circuit 110 does not display a hazard, an advisory alert, a caution alert or any other alert.

In an exemplary embodiment, lower radio frequency wave 210 contacts turbulence source 204. In this exemplary embodiment, turbulence source 204 is a hazard to airplane 101 based on the σ_load. In this exemplary embodiment, turbulence circuit 110 can be configured to control display 106 to show turbulence source 204, a hazard, a warning alert, an advisory alert, a caution alert and/or any combination thereof. In an exemplary embodiment, turbulence circuit 110 can store the σ_load in database 108 and compare the σ_load with the actual turbulence experienced by airplane 101 at turbulence source 204.

In FIG. 5, an illustration of an aircraft utilizing an aircraft turbulence detection and display system during the take-off phase of flight 200 is shown, according to exemplary embodiment. In an exemplary embodiment, airplane 101 is in the take-off phase of flight 200. In this exemplary embodiment, airplane 101 is leaving runway 212 at a leaving runway position 214. In this exemplary embodiment, turbulence circuit 110 transmits a warning and/or a signal representative of the turbulence to display 106. In this exemplary embodiment, aircrew utilizing the information provided by turbulence circuit 110, maneuver airplane 101 to avoid a take off/approach turbulence source 226. In this exemplary embodiment, airplane 101 climbs in airplane ascending position 216 to obtain an altitude that traverses take off/approach turbulence source 226. In this exemplary embodiment, airplane 101 achieves the cruise phase of flight 200 at a first cruise position 218. In an exemplary embodiment, airplane 101 in airplane ascending position 216 could also be characterized as being in a climb phase of flight 200.

In FIG. 6, an illustration of an aircraft utilizing an aircraft turbulence detection and display system during the landing phase of flight 200 is shown, according to exemplary embodiment. In an exemplary embodiment, airplane 101 is at a second cruise position 220 in the cruise phase of flight 200. In this exemplary embodiment, turbulence circuit 110 transmits a warning and/or a signal representative of the turbulence to display 106. In this exemplary embodiment, aircrew utilizing the information provided by turbulence circuit 110, maneuver airplane 101 to avoid take off/approach turbulence source 226. In this exemplary embodiment, airplane 101 has maintained an altitude above take off/approach turbulence source 226. In this exemplary embodiment, airplane 101 enters an approach phase of flight 200, which requires airplane 101 to descend to approach position 222. In this exemplary embodiment, airplane 101 lands on runway 212 at a runway position 224. In this exemplary embodiment, airplane 101 at approach position 222 could also be characterized as being in descent phase of flight 200. In an exemplary embodiment, approach phase of flight 200 could occur when airplane 101 is maneuvering at low altitudes in the vicinity of the airport.

Figure 7:
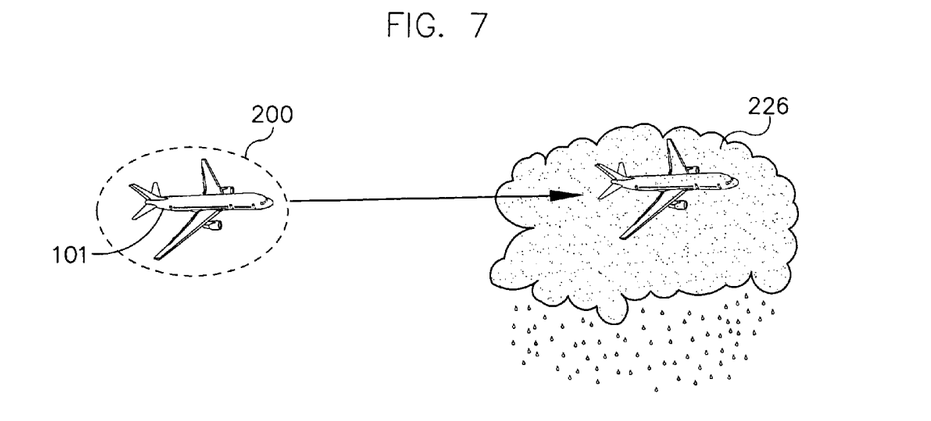
FIG. 7 is an illustration of an aircraft utilizing the aircraft turbulence detection and display system during enroute phase of flight, according to an exemplary embodiment.

In FIG. 7, an illustration of an aircraft utilizing an aircraft turbulence detection and display system during enroute phase of flight is shown, according to an exemplary embodiment. In an exemplary embodiment, airplane 101 is in cruise phase of flight 200 approaching take-off/approach turbulence source 226. In this exemplary embodiment, turbulence circuit 110 does not transmit a hazard signal, a warning alert, a signal representative of turbulence, an advisory signal and/or a caution signal. In this exemplary embodiment, airplane 101 can travel into and out of take off/approach turbulence source 226. In this exemplary embodiment, turbulence circuit 110 determined based on the change in phase of flight 200 that take off/approach turbulence source 226 was not a hazard to airplane 101. In another exemplary embodiment, turbulence circuit 110 can transmit an advisory, caution signal and/or signal representative of turbulence to display 106 based on take-off/approach turbulence source 226.

Figure 8:
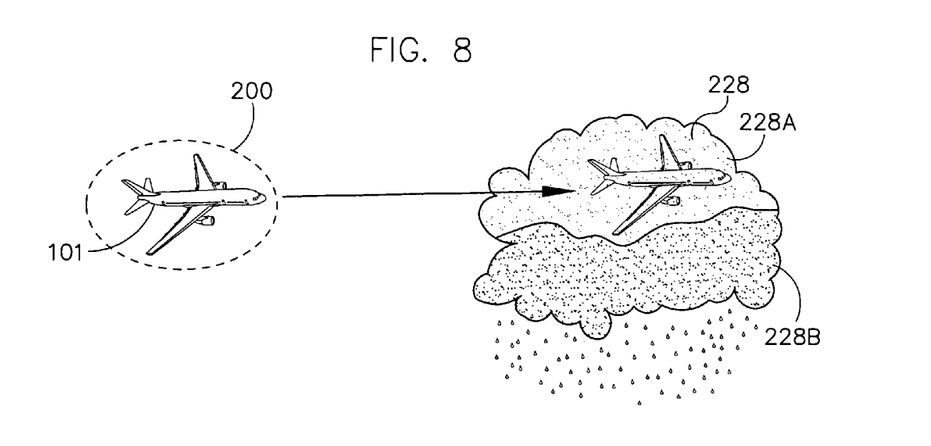
FIG. 8 is another illustration of an aircraft utilizing the aircraft turbulence detection and display system during enroute phase of flight, according to an exemplary embodiment.

In FIG. 8, an illustration of an aircraft utilizing an aircraft turbulence detection and display system during the enroute phase of flight 200 is shown, according to an exemplary embodiment. In an exemplary embodiment, airplane 101 is approaching a complex turbulence source 228. In this exemplary embodiment, complex turbulence source 228 has a caution zone 228a and a warning zone 228b. In an exemplary embodiment, turbulence circuit 110 transmits a signal representative of complex turbulence source 228 which indicates that airplane 101 can enter complex turbulence source 228 at caution zone 228a but should refrain from entering complex turbulence source 228 at warning zone 228b. In this exemplary embodiment, turbulence circuit 110 will issue a warning if airplane 101 approaches warning zone 228b.

Figure 9A:
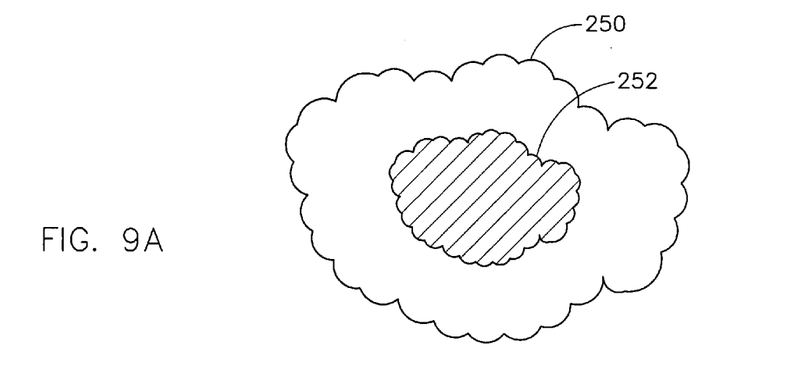
FIGS. 9A-9C are illustrations of the aircraft turbulence detection and display system calibration procedures, according to an exemplary embodiment.
Figure 9B:
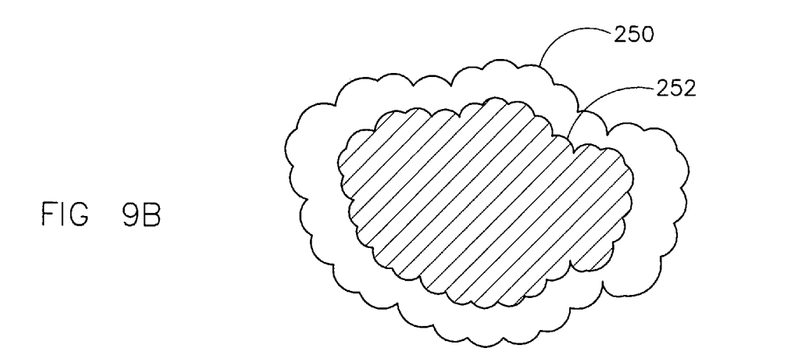
Figure 9C:
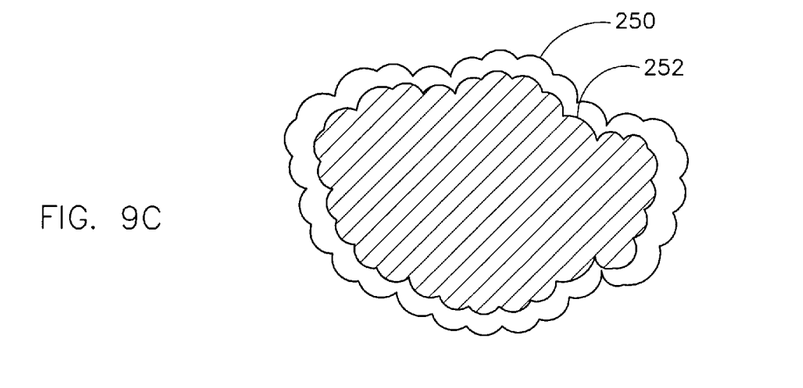

In FIGS. 9A-9C, illustrations of aircraft turbulence detection and display system calibration procedures are shown, according to exemplary embodiments. In an exemplary embodiment shown in FIG. 9A, radar system 102 (see FIG. 3) calculates a radar predicted turbulence value 250 that airplane 101 will encounter upon contact with turbulence source 202, 204, 226, and/or 228 (see FIGS. 4-8). In this exemplary embodiment, turbulence circuit 110 measures an actual turbulence value 252 experienced by airplane 101 upon contact with turbulence source 202, 204, 226, and/or 228. In this exemplary embodiment, turbulence circuit 110 compares radar predicted turbulence value 250 with actual turbulence value 252 and determines a first delta value between radar predicted turbulence value 250 and actual turbulence value 252. In this exemplary embodiment, turbulence circuit 110 calibrates at least one of radar system 102, turbulence circuit 110 and/or display 106 based on the first delta value. In an exemplary embodiment, a discrepancy report is generated based on the comparison of radar predicted turbulence value 250 and actual turbulence value 252.

In FIG. 9B, turbulence circuit 110 has recalibrated at least one of radar system 102, turbulence circuit 110 and/or display 106 based on first delta value. In this exemplary embodiment, radar system 102 calculates another radar predicted turbulence value 250 that airplane 101 will encounter upon contact with turbulence source 202, 204, 226, and/or 228. In this exemplary embodiment, turbulence circuit 110 measures actual turbulence value 252 experienced by airplane 101 upon contact with turbulence source 202, 204, 226, and/or 228. In this exemplary embodiment, turbulence circuit 110 compares radar predicted turbulence value 250 with actual turbulence value 252 and determines a second delta value between radar predicted turbulence value 250 and actual turbulence value 252. In this exemplary embodiment, second delta value is smaller than first delta value. In this exemplary embodiment, turbulence circuit 110 calibrates at least one of radar system 102, turbulence circuit 110 and/or display 106 based on the second delta value. In an exemplary embodiment, a discrepancy report is generated based on the comparison of radar predicted turbulence value 250 and actual turbulence value 252.

In FIG. 9C, turbulence circuit 110 has recalibrated at least one of radar system 102, turbulence circuit 110 and/or display 106 based on second delta value. In this exemplary embodiment, radar system 102 calculates another radar predicted turbulence value 250 that airplane 101 will encounter upon contact with turbulence source 202, 204, 226, and/or 228. In this exemplary embodiment, turbulence circuit 110 measures actual turbulence value 252 experienced by airplane 101 upon contact with turbulence source 202, 204, 226, and/or 228. In this exemplary embodiment, turbulence circuit 110 compares radar predicted turbulence value 250 with actual turbulence value 252 and determines a third delta value between radar predicted turbulence value 250 and actual turbulence value 252. In this exemplary embodiment, third delta value is smaller than second delta value. In this exemplary embodiment, turbulence circuit 110 calibrates at least one of radar system 102, turbulence circuit 110 and/or display 106 based on the third delta value. In an exemplary embodiment, a discrepancy report is generated based on the comparison of radar predicted turbulence value 250 and actual turbulence value 252.

It should be noted that this process may be a single step, multiple steps or an iterative process. It should also be noted that radar predicted turbulence value 250 could be smaller than actual turbulence value 252.

In an exemplary embodiment, the comparison of radar predicted turbulence value 250 with actual turbulence value 252 is stored in database 108. In an exemplary embodiment, this radar predicted turbulence value 250 versus actual turbulence value 252 is downloaded to a central off-board computer. The center off-board computer compares a plurality of radar predicted turbulence value 250 versus actual turbulence value 252 reports from a plurality of airplane 101. The center off-board computer generates trend analysis, correction factors, flags aircraft that could have potential maintenance issues, calculates aircraft specific correction factors, calculates aircraft type correction factors and/or compares turbulence system performance versus aircraft maintenance. In an exemplary embodiment, radar system 102, turbulence circuit 110 or another on-board processing device could generate the trend analysis, correction factors, flag aircraft that could have potential maintenance issues, calculate aircraft specific correction factors, calculate aircraft type correction factors and/or compare turbulence system performance versus aircraft maintenance.

Figure 10:
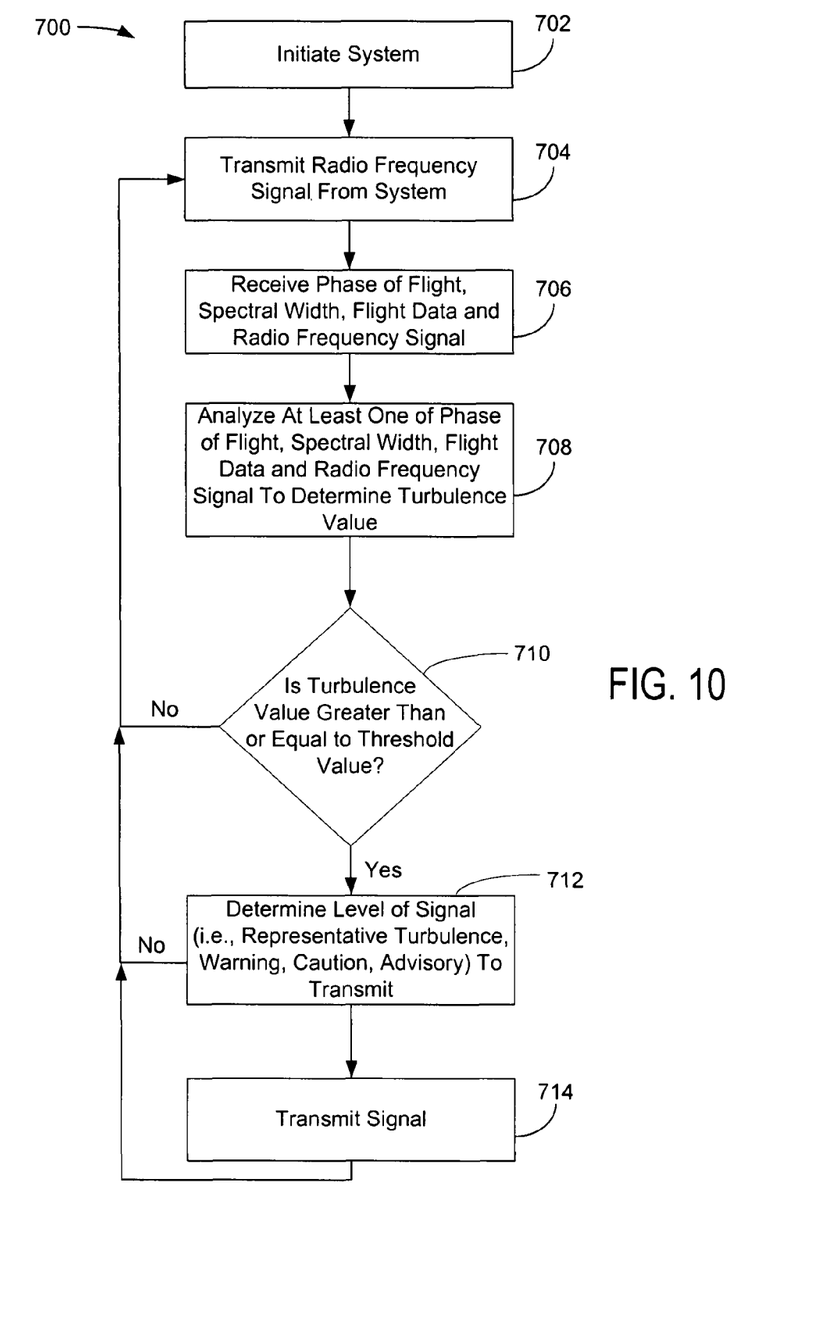
FIG. 10 is a flowchart of system operation procedures, according to an exemplary embodiment.

In FIG. 10, a flowchart 700 of system operation procedures is shown, according to an exemplary embodiment. In this exemplary embodiment, the system is initiated (step 702). Radar system 102 transmits a first radio frequency wave (step 704). Turbulence circuit 110 receives a second radio frequency wave, phase of flight 200, spectral width data and flight data (step 706). Turbulence circuit 110 analyzes at least one of phase of flight 200, spectral width function, second radio frequency wave and flight data to determine radar predicted turbulence value 250 (step 708). Turbulence circuit 110 determines whether radar predicted turbulence value 250 is greater than or equal to a threshold value (step 710). If radar predicted turbulence value 250 is not greater than or equal to a threshold value, the system returns to step 704 (step 710). If radar predicted turbulence value 250 is greater than or equal to a threshold value the system moves to step 712 (step 710). Turbulence circuit 110 determines the level of signal to be transmitted based on radar predicted turbulence value 250 (step 712). In an exemplary embodiment, the level of signal can be an advisory signal, a caution signal, a warning signal and/or a signal representative of the turbulence profile. Turbulence circuit 110 transmits the signal determined in step 712 (step 714).

Figure 11:
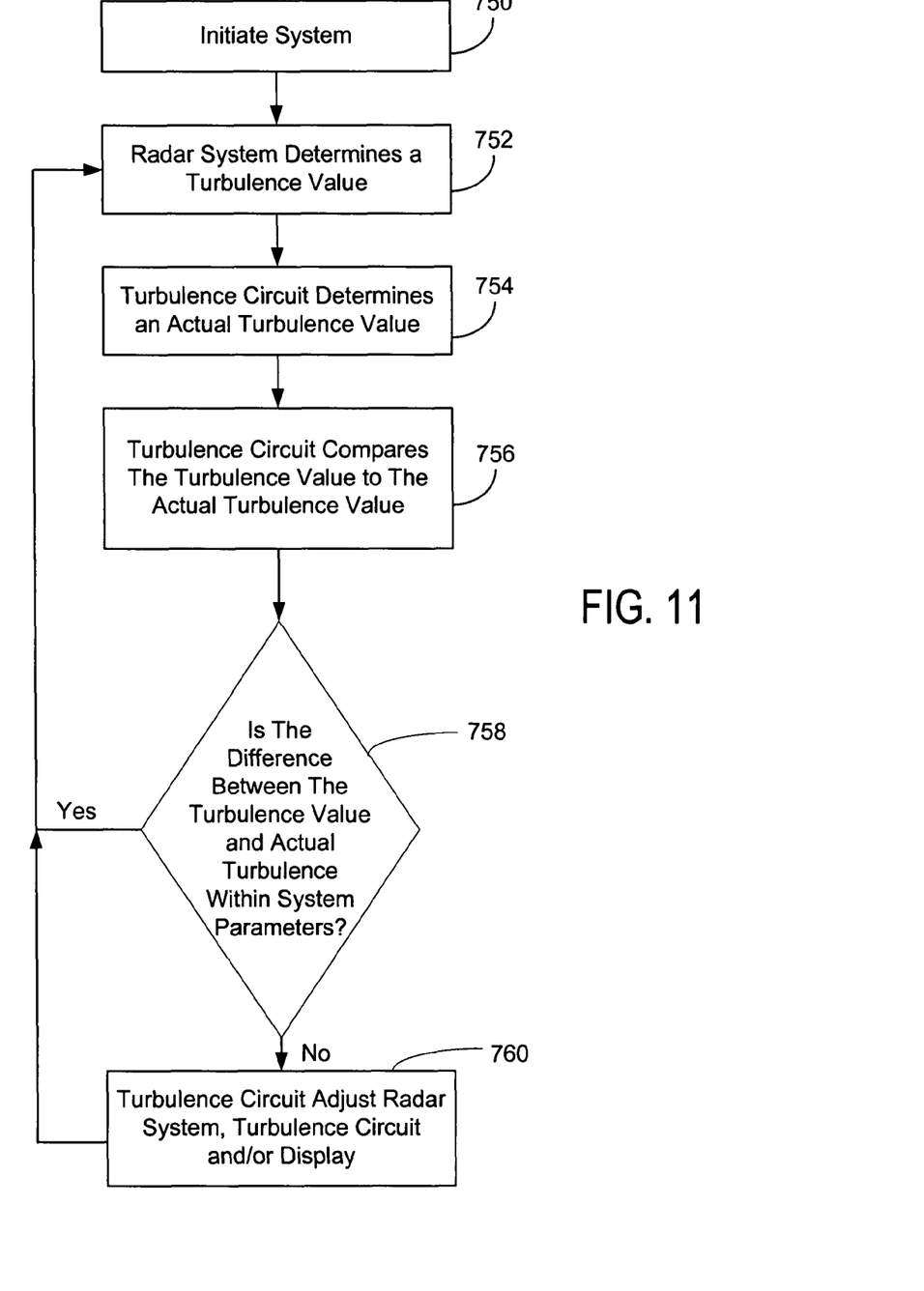
FIG. 11 is a flowchart of system calibration procedures, according to an exemplary embodiment.

In FIG. 11, a flowchart of system calibration procedure is shown, according to an exemplary embodiment. In an exemplary embodiment, the system is initiated (step 750). Radar system 102 determines radar predicted turbulence value 250 (step 752). Turbulence circuit 110 determines actual turbulence value 252 (step 754). Turbulence circuit 110 compares radar predicted turbulence value 250 to actual turbulence value 252 (step 756). Turbulence circuit 110 adjusts radar system 102, turbulence circuit 110 and/or display 106 based on the comparison of radar predicted turbulence value 250 and actual turbulence value 252 (step 758).

Figure 12A:
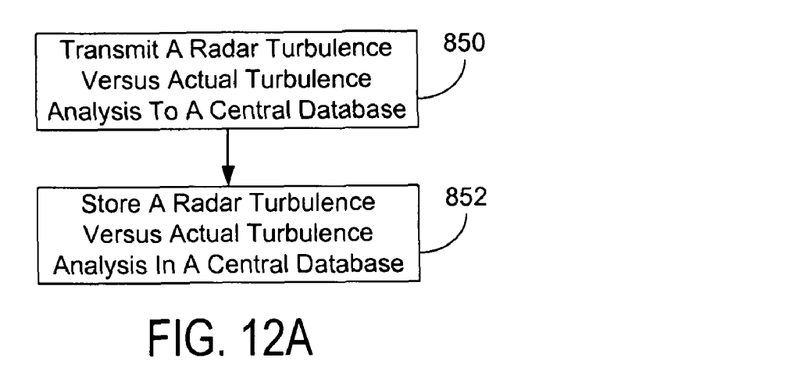
FIG. 12A is a flowchart of on-board system to off-board computer downloading procedures, according to an exemplary embodiment.

In FIG. 12A, a flowchart of on-board system to off-board computer downloading procedure is shown, according to an exemplary embodiment. In an exemplary embodiment, turbulence circuit 110 transmits a radar predicted turbulence value versus actual turbulence value analysis signal to a central off-board computer (step 850). The central off-board computer stores the radar predicted turbulence value versus actual turbulence value analysis signal (step 852).

Figure 12B:
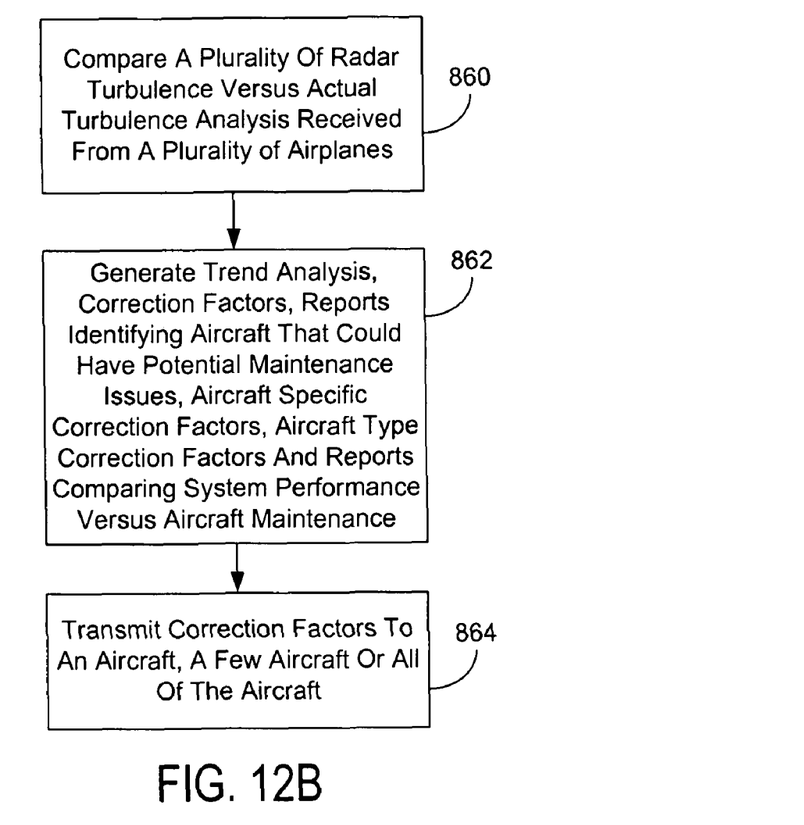
FIG. 12B is a flowchart of off-board computer to on-board system uploading procedures, according to an exemplary embodiment.

In FIG. 12B, a flowchart of off-board computer to on-board system uploading procedure is shown, according to an exemplary embodiment. In an exemplary embodiment, central off-board computer compares a plurality of radar predicted turbulence value versus actual turbulence value analysis received from a plurality of airplanes (step 860). The central off-board computer generates trend analysis, correction factors, flags aircraft that could have potential maintenance issues, calculates aircraft specific correction factors, calculates aircraft type correction factors and/or compares turbulence system performance versus aircraft maintenance (step 862). The central off-board computer transmits correction factors to one aircraft, a few aircraft or all of the aircraft (step 864).

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of turbulence circuit 110 as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. For use in an aircraft, including a radar system, a display for receiving a display signal representative of turbulence, a flight management system configured to determine a phase of flight, and an aircraft inertial/air data system configured to determine an altitude and an airspeed, a turbulence detector comprising:

a processor is configured to provide a turbulence warning, the turbulence warning being in response to a spectral width factor from the radar system and a function of the altitude and airspeed representing vertical load divided by spectral width, the function being modified by a P factor, the P factor being a function of the phase of flight.

2. The detector of claim 1, wherein the phase of flight is based on at least one of a weight on wheels, a flight plan, a vertical speed, the altitude and the airspeed.

3. The detector of claim 1, wherein the detector transmits a signal representative of the presence of turbulence to the display off of the aircraft.

4. The detector of claim 1, wherein the detector transmits a turbulence advisory data to the display based on at least one of the phase of flight, the altitude, the airspeed and the spectral width factor.

5. The detector of claim 4, wherein the phase of flight is based on at least one of a weight on wheels, a flight plan, a vertical speed, the altitude and the airspeed; and wherein the detector transmits a signal representative of the presence of turbulence to the display.

6. The detector of claim 1, further comprising the detector being coupled to a terrain awareness warning system to provide a composite display signal and wherein the composite display signal represents a terrain profile and a turbulence profile.

7. The circuit of claim 1, wherein the P factor is adjusted in accordance with in-situ turbulence measurements and radar-derived turbulence measurements.

8. The circuit of claim 7, wherein versions of the P factor are stored.

9. The system of claim 1, wherein the turbulence is detected by determining a vertical load factor.

10. A method for providing a turbulence detection and display system, comprising:
receiving an altitude signal, and an airspeed signal; and
determining a turbulence warning based on a correction factor and a function of the altitude, and airspeed corresponding to vertical load per spectral width, the correction factor related to in-situ determinations of turbulence and radar predicted turbulence.

11. The method of claim 10, wherein the correction factor is a function of phase of flight.

12. The method of claim 10, further comprising transmitting a turbulence advisory data to the display based on at least one of the phase of flight, the altitude signal, the airspeed signal and a spectral width.

13. The method of claim 11, wherein the phase of flight is based on at least one of a weight on wheels, a flight plan, a vertical speed, the altitude signal and the airspeed signal; and wherein the turbulence data circuit transmits the signal representative of the presence of turbulence to the display.

14. The method of claim 13, wherein the vertical load factor is determined by multiplying the spectral width by the function.

15. The method of claim 10, further comprising receiving a terrain signal from a terrain awareness warning system and transmitting a composite display signal to a display; and
wherein the composite display signal represents a terrain profile and a turbulence profile.

16. A turbulence detection and display system, comprising:
a means for receiving a phase of flight signal, an altitude signal, and an airspeed signal; and
a means for determining a signal representative of the presence of turbulence based on radar data and the phase of flight signal, the altitude signal and the airspeed signal.

17. The system of claim 16, wherein the phase of flight is based on at least one of a weight on wheels, a flight plan, a vertical speed, the altitude signal and the airspeed signal.

18. The system of claim 16, wherein the means for determining transmitting a turbulence advisory data to the display based on at least one of the phase of flight, the altitude signal, the airspeed signal and the second radio frequency wave.

19. The system of claim 18, wherein the phase of flight is based on at least one of a weight on wheels, a flight plan, a vertical speed, the altitude signal and the airspeed signal; and wherein the signal representative of the presence of turbulence is transmitted to the display.

20. The system of claim 16, further comprising a database for storing turbulence characterization data based upon in-situ determinations or turbulence and radar derived determinations of turbulence.

* * * * *